United States Patent [19]

Tochon

[11] 3,772,041

[45] Nov. 13, 1973

[54] VITROCERAMICS

[75] Inventor: Jean Paul Tochon, Saint-Cloud, France

[73] Assignee: Saint-Gobain Industries, Neuilly sur Seine, France

[22] Filed: May 24, 1971

[21] Appl. No.: 146,247

[30] Foreign Application Priority Data

May 26, 1970 France .............................. 7019175

[52] U.S. Cl. .................................... 106/39.6, 65/33
[51] Int. Cl. ............................ C03c 3/22, C03c 3/04
[58] Field of Search ...................... 106/39 DV, 39.6

[56] References Cited
UNITED STATES PATENTS

| | | | |
|---|---|---|---|
| 3,007,804 | 11/1961 | Kreidl et al. ................... | 106/39 DV |
| 3,205,079 | 9/1965 | Stookey ......................... | 106/39 DV |
| 3,486,963 | 12/1969 | Smith ............................. | 106/39 DV |

FOREIGN PATENTS OR APPLICATIONS

| | | | |
|---|---|---|---|
| 986,289 | 3/1965 | Great Britain ................ | 106/39 DV |
| 1,133,010 | 11/1968 | Great Britain ................ | 106/39 DV |
| 1,474,487 | 3/1967 | France ........................... | 106/39 DV |
| 1,471,337 | 1/1969 | Germany ....................... | 106/39 DV |

*Primary Examiner*—A. B. Curtis
*Assistant Examiner*—Mark Bell

[57] ABSTRACT

Translucent and opaque vitroceramics of fine grain and high quality are produced from compositions having 90 percent or more of 4–5 specific oxides with the exclusion of all but minor percentages of other ingredients. The invention describes the raw materials, the composition of the glass from which the vitroceramics are made, and the novel processes by which they are produced.

10 Claims, 1 Drawing Figure

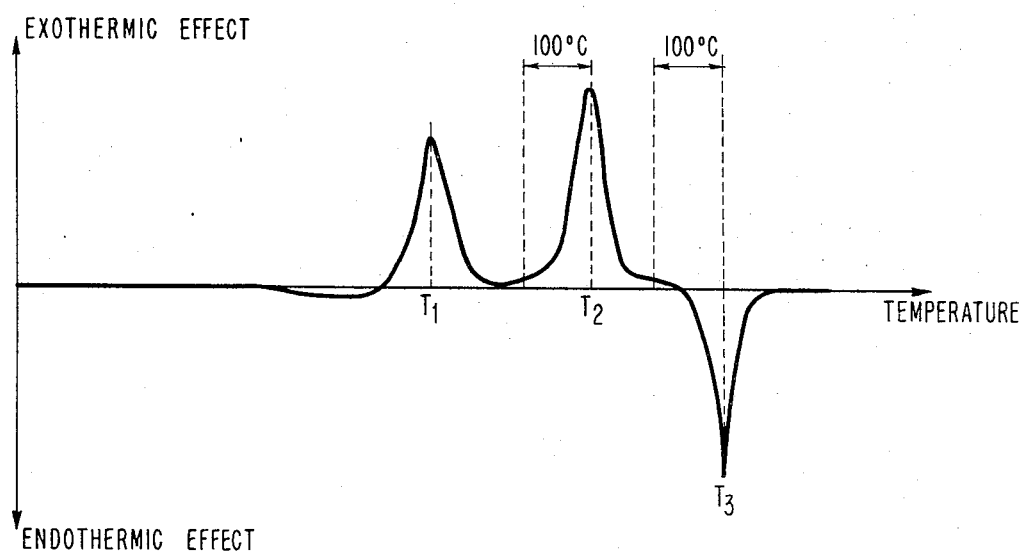

VITROCERAMICS

This invention relates to the industrial production of vitroceramics of high quality and includes new compositions of raw materials, to glasses of novel compositions, to novel vitroceramics, and to novel methods of producing them.

The principle used in the prior art in the manufacture of vitroceramics was to melt glass from a special composition of raw materials, to shape it by one of the ordinary techniques of the glass industry, and to transform the shaped piece more or less completely into polycrystalline material using thermal treatments called ceramization. Those treatments of transformation usually included two essential phases, one called nucleation during which germs or nuclei are formed, and a later phase of crystallization during which these germs are developed into crystals at the expense of the vitreous matrix. The first phase, nucleation, generally occurs at a temperature near the softening temperature of the glass. The crystallization goes forward at higher temperatures.

The manufacture by such known processes of vitroceramic articles which possess simultaneously thermal, mechanical, and chemical properties of high quality could only be obtained by the use of costly raw materials, by raw materials difficult to work with, or by the use of difficult or expensive techniques.

It is an object of this invention to make vitroceramics having mechanical properties such as resistance to bending, to shocks, and to abrasion; chemical properties such as resistance to corrosion and water; and thermal properties such as refractoriness and resistance to thermal shock or high quality, and to make them from industrial raw materials of low cost. Another object is to perfect a process which is better adapted to the rapid and mechanized formation of articles than are the processes of the prior art, which produces products of better qualities, which permits diversification and the production of different vitroceramics for different purposes, and to accomplish these objects by thermal treatments. Other objects of the invention will appear as the description proceeds.

The objects of the invention are accomplished generally speaking by producing from selected, low-cost raw materials a group of glasses of which the composition shown in Table 1 represents at least 90 percent of the total mass of the glass.

TABLE 1

| Principal constituents | General proportions (% by weight) |
| --- | --- |
| $SiO_2$ | 16 – 38 |
| $Al_2O_3$ | 20 – 50 |
| $CaO$ | 10 – 35 |
| $ZrO_2$ | 6 – 15 |

In this composition the CaO may be replaced by MgO provided the CaO remains superior to 10 percent, the molar ratio of MgO to CaO remains inferior to 0.15, and the MgO content does not exceed 3 percent by weight of the mass of the glass.

The principal constituents may be derived from common raw materials of the glass industry, silica sand, limestone, dolomite, talc, hydrated alumina, certain blast furnace slags, bauxite, kaolin, and zircon sand. It is also possible to use other natural rocks or industrial by-products always with the reservation that the impurities imported by the raw materials do not exceed 10 percent of the mass of the glass. In particular, the content of $Na_2O$ and $K_2O$ may not exceed 3 percent of either of them or 4 percent of their total. We have established the fact that the indicated proportion of zirconium oxide plays an essential role in the mechanism of ceramization and is found in certain of the final crystals either in the pure state or in the form of compositions, jointly with other crystals from which it is absent. Among the latter type of crystals gehlenite and anorthite have been identified. Gehlenite has the formula $2CaO \cdot Al_2O_3 \cdot SiO_2$ and melts at 1,593°C. Anorthite has the formula $CaO \cdot Al_2O_3 \cdot 2SiO_2$ and melts at 1,553°C. These crystals have been identified from the work of Levin, Robbins and McMurdie entitled "Phase Diagrams for Ceramists" but their work was conducted in the absence of $ZrO_2$.

The viscosity of the novel glasses quickly diminishes above the liquidus so that their temperature of fusion and fining remain on the order of 1,500°–1,600°C. generally attaining as much as 1,650°C. for the higher contents of alumina.

The novel process, in addition to the novelty of the raw material compositions and the novel composition of the glasses, has a phase of nucleation at temperatures between 850° and 1,100°C. and a phase of crystallization between 1,000° and 1500°C. It is generally advantageous to establish levels of temperature in these phases in order to accomplish them under optimum conditions of speed of nucleation and thereafter of crystallization. The preferred temperatures for nucleation are generally situated between the dilatometric softening temperature of the glass and a temperature inferior thereto by about 50°C.

The temperature at which the phase of crystallization is carried out is preferably located by less than 100°C below the temperature T3 on the accompanying diagram which is the temperature at which the principal crystalline phase resulting from the thermal treatment redissolves into the vitreous phase; the temperature T3 is readily found as the endothermic peak on the differential thermal diagram as illustrated. Nevertheless when it is the object to produce translucent vitroceramics the temperature of crystallization should be within about 100°C. below the temperature T2 in the diagram. The first exothermic peak of crystallization is indicated at T1. The speed at which the temperature of the glass can be allowed to rise during vitroceramization is restricted by the danger of deforming the object being treated; it is therefore useful to use a rate of increase which will avoid deformation, for example 5°–10°C./min. for plates lying upon a flat support during treatment. It will be understood that such plates are usually of reasonably uniform thickness and of the order of thickness of the product technically called flat glass.

The cooling of the treated objects may be carried out freely, for instance at the natural cooling rate of a furnace of low thermal inertia such as would be employed during the treatment, the cooling rates of which are, for example, about 500°C./hr. Different cooling rates may be employed for vitroceramics of different shapes, thicknesses, and compositions, it being left to skilled persons to adapt the cooling rate to the object under manufacture.

The novel thermal treatment makes it possible to diversify the properties of the products so as to produce different properties from a single composition. By choosing certain levels of temperature and durations of nucleation and of crystallization the dimensions and the structure of the crystals formed may be altered as well as the nature and percentage of the residual phase. Certain generalities can be postulated which will establish for each composition the best treatment for producing special properties, in particular, and as an example compositions of $SiO_2$ — 25–35 percent, $Al_2O_3$ — 40–50 percent, CaO — 10–20 percent, $ZrO_2$ — 8–12 percent will produce translucent vitroceramics when the crystallization is carried out at temperatures on the order of 1,100°C.; whereas the same compositions produce white opaque objects when the treatment of crystallization is on the order of 1,300° to 1,450°C. I have established the fact that this change in appearance does not result from more complete or finer crystallization but from the formation of different crystalline combinations which produce different physical properties. The invention also provides the possibility of making vitreous products of good mechanical strength, having softening temperatures above 1,350°C. and fusion points between about 1,550° and 1,600°C. Such high quality products are produced from glasses made of the composition $SiO_2$ — 25–28 percent, $Al_2O_3$ — 38–44 percent, CaO — 20–26 percent, $ZrO_2$ — 9–12 percent by a thermal treatment including short periods of nucleation and crystallization. The nucleation may be carried out at about 900°C. for not more than about 30 minutes, the crystallization following between 1,300° and 1330°C. for not over 10 minutes.

Another feature of the invention is the production of refractory vitroceramics which are still thermally stable at 1,500°C. from glasses having the chemical composition by weight $SiO_2$ — 26–30 percent, $Al_2O_3$ — 45–50 percent, CaO — 10–16 percent, $ZrO_2$ — 8–12 percent which are nucleated between 900° and 1,100°C. over a period not longer than 3 hours and crystallization between 1,350° and 1,500°C. for not more than 2 hours.

Considering the temperature levels at which nucleation occurs it is generally advantageous either to adopt a slow rate of temperature increase or to establish a period of stable temperature in the nucleation zone.

Generally the properties of the vitroceramics which are produced by the invention are more strongly influenced by the length of the step of nucleation than by its temperature level, and more by the maximum temperature of the level attained during crystallization than by duration of that temperature.

The mechanical resistance of the new products has been determined by the use of a four point circular bending apparatus on parallelepipedic samples 130 × 10 × 4 mm. cut off by a diamond cutting wheel in a plate 10 mm. thick from the vitroceramic under study, the forces being applied to the sawn faces. Thus measured, the mechanical resistance to bending of the new vitroceramics reaches from 20 to 35 kg./mm$^2$.

The resistance of the new products to abrasion expressed by a loss of weight in mg./cm$^2$ was measured by taking a test piece in the form of a cylinder 35 mm. in diameter polished on the face to be tested, and applying a rotating disk covered by abrasive paper, silicon carbide grain number 320, with a force of 4 kg. The loss of weight is determined after 100 turns of the disk, the operation being renewed after replacement of new grinding paper as many times as is necessary to attain a practically constant loss of weight through 10 successive series of 100 turns. The resistance to abrasion is the cumulative loss of weight of these 10 series of 100 revolutions expressed in mg./cm$^2$. The figures obtained have generally fallen between 1.4 and 2.7.

The resistance to thermal shocks has been determined upon test pieces 80 × 30 × 5 mm. at 75°C. by plunging them into water at 17°C. If the test piece does not exhibit fissures it is returned to the furnace and raised to a temperature 25°C superior to the first, that is to say 100°C. and so on until it cracks. A very large number of the novel products have been submitted to such tests and have withstood thermal shocks greater than 800°C.

Hydrolytic resistance of the new products has been determined by placing 1 g. of crushed and screened powder of sizes between 80 and 100 microns in a stainless steel beaker containing 100 cc. of distilled water, overlaid by a refrigerant and placed in a constant temperature bath at 99.9°C. The hydrolytic resistance is expressed as the quantity of product which passes into solution in 5 hours, stated as milligrams per gram of product. Under this test the hydrolytic resistance is from 1 to 8 mg./g.

Surface hardness has been measured by a Reichert microdurometer expressed in kg./mm.$^2$. The figure corresponds to the weight necessary to force the diamond point into the material until the diagonal of the intaglio measures 10 microns. Measurements are made on a cut and polished surface. The results of these tests on various novel vitroceramics of the invention have yielded figures from 740 to 840.

The softening temperature of the new products is given as the temperature of the first endothermic peak of the curves of differential thermal analysis, of which the drawing gives an illustration. The temperature of this first peak corresponds reasonably to that which can be determined by dilatometry. The results obtained in this or that partial region situated within the general region expressed in Table 1 are given as illustrations in the following examples but are not to be taken as limitations. In every case the thermal treatments have been carried out in an electrical resistance furnace without precautions with regard to the atmosphere.

EXAMPLE 1

A vitrifiable mixture containing 20.8 kg. of silica sand, 40 kg. of limestone, 64.4 kg. of hydrated alumina, and 15.2 kg. of zircon sand in each 100 kg. of glass at temperatures of fusion and fining attaining 1,590°C. produced the following glass having the composition, expressed in terms of its principal oxides in percent by weight:

| Fusion ER 82 | |
| --- | --- |
| $SiO_2$ | 26 |
| $Al_2O_3$ | 42 |
| CaO | 22 |
| $ZrO_2$ | 10 |

Plates of this glass were submitted to different thermal treatments of ceramization as follows:

| Number of the test | Heating to 900° C. | Halt at 900° C. | Rise from 900° C. to/in | Crystallization | | |
| --- | --- | --- | --- | --- | --- | --- |
| | | | | At | During | Cooling |
| ER 82 G | In 3 hr | 30 min | 1,350°/2 hr | 1,350° | 30 min | Free. |
| ER 82 H | In 3 hr | 6 hr | 1,350°/2 hr | 1,350° | 6 hr | Do. |
| ER 82 I | In 2 hr | 2 hr | 1,330°/2 hr | 1,330° | 2 hr | Do. |

The vitroceramics produced by these treatments are of fine grain, white color in the mass and lightly ivory in the surface. They have many interesting characteristics of which the principal ones are expressed in the following table:

| Properties | Products Treated | | |
|---|---|---|---|
| | 82 G | 82 H | 82 I |
| Resistance to bending (Kg./mm.²) | 19.2 | 22.5 | 34.7 |
| Resistance to abrasion, loss of weight in mg./cm.² | 2.46 | 2.07 | 2.18 |
| Surface hardness (kg./mm.²) | 741 | | 834 |
| Resistance to thermal shock (°C.) | 800 | 800 | >800 |
| Softening temperature begins at °C. | 1350 | 1350 | 1350 |
| Hydrolytic resistance in mg./g. | 6 | 6 | 4 |
| Coefficient of linear dilation (× 10⁻⁷) | | | about 80 |
| Nature of the crystals | | | principally 2 CaO · ZrO₂ · 4 SiO₂ |

A study of this table reveals the following:

The test piece ER 82 H which was crystallized at 1,350°C. for 6 hours had flexing resistance less than when the temperature is better chosen, as in piece ER 82 I in which the crystallization was at 1,330°C. and the duration was only 2 hours.

The bending resistance was between 20 and 35 kg./mm.² whereas it is on the order of 10 kg./mm.² for tempered glass and 7 to 9 kg./mm.² for a conventional ceramics of high quality such as those porcelains which are used in electrotechnology.

The resistance to abrasion was between 2 and 2.5 which compares with 1.43 for agate and 5.84 for plate glass.

Surface hardness was between 740 and 840 kg./mm.² compared to 880 for agate and to 695 for a sample of flooring stoneware.

The resistance to thermal shock was 800°C. and up which compares favorably with various products of small thermal dilation of which many are much more costly.

Thermal resistance was from 4 to 6 mg./g. whereas it is 12.5 mg./g. for plate glass.

If one uses the glass ER 82 with shorter periods of nucleation and crystallization one obtains the results shown in the following table with excellent properties of mechanical resistance:

| Number of the test | Nucleation Temp. °C. | duration min. | crystallization Temp. °C. | duration min. | resistance to bending kg./mm.² |
|---|---|---|---|---|---|
| ER 82 P. | 900 | 10 | 1330 | 0 | 16 |
| ER 82 O. | 900 | 30 | 1330 | 0 | 16.5 |
| ER 82 N. | 900 | 10 | 1330 | 10 | 17.8 |
| ER 82 K. | 900 | 30 | 1330 | 10 | 27 |

It is to be noted that the value given for the duration of crystallization in ceramics ER 82 P and ER 82 O means that the program of regulation for the furnace included only the rise in temperature to the maximum indicated, without establishing a period of even temperature, but followed immediately by cooling.

EXAMPLE 2

The raw materials used were of good purity and the following composition:

| | SiO₂ | Al₂O₃ | CaO | MgO | ZrO₂ | Na₂O K₂O |
|---|---|---|---|---|---|---|
| Zircon sand | 33.2 | 0.1 | | | 65.7 | 0.14 |
| Bauxite (PSG) | 7.0 | 61.45 | 0.40 | | | 0.4 |
| Kaolin | 46.85 | 37.6 | 0.10 | 0.15 | | 1.98 |
| Slag (Senelle) | 33.60 | 15.70 | 42.35 | 4.30 | | 1.2 |

The following table compares glass compositions containing the essential oxides SiO₂, Al₂O₃, CaO, and ZrO₂ with compositions in which some CaO has been replaced with MgO.

| No. of Fusion | SiO₂ | Al₂O₃ | CaO | MgO | ZrO₂ | MgO/CaO mol. |
|---|---|---|---|---|---|---|
| ER 81 | 26 | 34 | 30 | - | 10 | 0 |
| ER 105 | 26 | 34 | 26 | 4 | 10 | 0.215 |
| ER 176 | 26.3 | 42.6 | 17.8 | 3.2 | 10.1 | 0.20 |
| ER 177 | 26.2 | 42.2 | 19.9 | 1.6 | 10.1 | 0.10 |

Plates of these glasses were subjected to ceramization by the following thermal treatments:

| Number of the test | Heating to/in | Kept at/for | Heating to/in | Kept at/for | Cooling |
|---|---|---|---|---|---|
| ER 81 | 900°/3 hr | 900°/2 hr | 1,300°/70 min | 1,300°/2 hr | Free. |
| ER 105 | 900°/3 hr | 900°/2 hr | 1,250°/70 min | 1,250°/2 hr | Do. |
| ER 176 | 900°/3 hr | 900°/1 hr | 1,330°/2 hr | 1,330°/1 hr | Do. |
| ER 177 | 900°/3 hr | 900°/1 hr | 1,330°/2 hr | 1,330°/1 hr | Do. |
| ER 82 F | 900°/3 hr | 900°/1 hr | 1,330°/2 hr | 1,330°/2 hr | Do. |

Test 82 F included a test piece of the same composition as those labeled ER 82.

The principal characteristics of the vitroceramics of this example are:

| | ER 81 | ER 105 | ER 176 | ER 177 | ER 82 F |
|---|---|---|---|---|---|
| Bending resistance (kg./mm.²) | 12.3 | 12 | 6 | 17 | 28.2 |
| Softening begins about (° C.) | 1,365 | 1,330 | 1,330 | 1,345 | 1,350 |

The substitution of MgO for CaO in the proportions indicated extends the choice of raw materials which can be used, notably in the direction of blast-furnace slags while maintaining good mechanical resistance in the products.

EXAMPLE 3

This example relates to glass ER 172 and ER 173 which contain respectively 6 and 8 percent of ZrO₂, that is to say less than glass ER 82.

| No. of Fusion | SiO₂ | Al₂O₃ | CaO | ZrO₂ |
|---|---|---|---|---|
| ER 172 | 26.5 | 43 | 22.5 | 8 |
| Er 173 | 27 | 44 | 23 | 6 |
| ER 82 | 26 | 42 | 22 | 10 |

The thermal treatment used included heating to 900°C. in 3 hours, holding at 900°C. for 2 hours, heating from 900°–1,300°C. in 2 hours, and holding at 1,300°C. for 2 hours. The glasses had the following characteristics:

| | ER 172 | ER 173 | ER 82 |
|---|---|---|---|
| Mechanical resistance (kg./mm.²) | 16.1 | 14.2 | 19.6 |
| Softening temperature (°C.) | 1350 | 1350 | 1350 |

The mechanical resistance of vitroceramics is shown to have been reduced when the concentration of $ZrO_2$ is less than 10 percent.

EXAMPLE 4

Following the methods of fusion illustrated above, and after a thermal crystallization at lower temperature, a translucent vitroceramic of satisfactory quality was produced:

Raw materials:
Sand 24.91 kg./100 kg. of glass
Limestone 21.8 kg./100 kg. of glass
Hydrated alumina 73.61 kg./100 kg. of glass
Zircon sand 15.22 kg./100 kg. of glass
Temperature of fusion and fining 1640°C.

The theoretical composition of the glass (ER 112) was:

$SiO_2$     30 percent by weight
CaO         12 percent by weight
$Al_2O_3$   48 percent by weight
$ZrO_2$     10 percent by weight The thermal ceramization treatments for ER 112E were these: Heat the glass to 900°C. in 3 hours; hold at 900°C. for 2 hours; heat from 900° to 1,100°C. in 1 hour; hold at 1,100°C. for 2 hours; cool to 800°C. in 45 minutes.

The vitroceramic had the following characteristics:
Appearance — translucent
Crystals — anorthite
Bending resistance — 14 kg./mm.$^2$
Abrasion resistance — 2.7 mg./cm.$^2$
Surface hardness — 780 kg./mm.$^2$
Hydrolytic resistance — 1.1 mg./g.
Softening temperature begins at — 1500°C.

The high temperature of softening is to be noted, it being evident that during the measurement of the softening temperature the vitroceramic underwent a new crystallization and that the final vitroceramic had altered constitution and properties, particularly in this that the translucent product became opaque.

EXAMPLE 5

Vitroceramic products having an initial softening temperature above 1,500°C. can be produced from glasses of which the following compositions, and the preceding ones, are exemplary. The conditions of working and treatment illustrate those which assist in their production. The temperatures of fusion of these glasses are on the order of 1,600° and 1,650°C. During ceramization the step of nucleation is between 1,000° and 1,100°C. and the step of crystallization between 1,250° and 1,450°C. It is to be understood that these values pertain to these particular products and are not limitations:

| Compositions of the glasses | $SiO_2$ | CaO | $Al_2O_3$ | $ZrO_2$ |
|---|---|---|---|---|
| ER 96  | 30 | 12 | 48 | 10 |
| ER 116 | 28 | 16 | 46 | 10 |
| ER 117 | 28 | 14 | 48 | 10 |
| ER 120 | 28 | 14 | 46 | 12 |

Raw materials in kg./100 kg. of glass

|  | ER 96 | ER 116 | ER 117 | ER 120 |
|---|---|---|---|---|
| Sand | 24.9 | 22.9 | 22.9 | 21.9 |
| Limestone | 21.8 | 29.1 | 25.4 | 25.4 |
| Hydrated alumina | 73.6 | 70.5 | 73.6 | 70.5 |
| Zircon sand | 15.2 | 15.2 | 15.2 | 18.3 |

Ceramization treatments:

| No. of the test | Heat to/in | Hold at/for | Heat to/in | Hold at/for | Cool to 800° C. |
|---|---|---|---|---|---|
| ER 96  | 1,050°/3.5 hr | 1,050°–1,100°/3 hr | 1,450°/70 min | 1,450°/2 hr | Free. |
| ER 116 | 900°/3 hr | 900°/2 hr | 1,350°/90 min | 1,350°/2 hr | Do. |
| ER 117 | 900°/3 hr | 900°/2 hr | 1,350°/90 min | 1,350°/2 hr | Do. |
| ER 120 | 900°/3 hr | 900°/2 hr | 1,350°/90 min | 1,350°/2 hr | Do. |

Properties of the products:

| Vitroceramics | ER 96 | ER 116 | ER 117 | ER 120 |
|---|---|---|---|---|
| Initial Softening Temperature (°C.) | 1500 | 1510 | 1515 | 1525 |

As many apparently widely different embodiments of the present invention may be made without departing from the spirit and scope thereof, it is to be understood that the invention is not limited to the specific embodiments.

What is claimed is:

1. A vitroceramic body consisting essentially of at least 90 percent by weight of $SiO_2$, $Al_2O_3$, Cao with or without MgO, and $ZrO_2$, in the following proportions by weight

| $SiO_2$ | 25–28% |
| $Al_2O_3$ | 38–44% |
| CaO | 20–26% |
| $ZrO_2$ | 9–12% |

MgO, if present, not exceeding 3 percent of the weight of the body and the ratio of MgO/CaO being less than 0.15, and $Na_2O$ and $K_2O$, if present, not exceeding 3 of either nor 4 percent for both.

2. Strong vitroceramics having a softening point above 1,350°C. and consisting essentially, by weight, of $SiO_2$ 25–28 percent $Al_2O_3$ 38–44 percent, CaO 20–26 percent, $ZrO_2$ 9–12 percent.

3. A vitroceramic body according to claim 1, having a softening point at least about 1,350°C., containing crystals of pure $ZrO_2$ and crystals of anorthite, and being opaque and of white color.

4. A vitroceramic body according to claim 1, having a softening point at least about 1,350°C., containing crystals of pure $ZrO_2$ and crystals of gehlenite, and being opaque and of white color.

5. A vitroceramic body consisting essentially of at least 90 percent by weight of $SiO_2$, $Al_2O_3$, Cao with or without MgO, and $ZrO_2$, in the following proportions by weight

| $SiO_2$ | 26–30% |
| $Al_2O_3$ | 45–50% |
| CaO | 10–16% |
| $ZrO_2$ | 8–12% |

MgO, if present, not exceeding 3 percent of the weight of the body and the ratio of MgO/CaO being less than 0.15, and $Na_2O$ and $K_2O$, if present, not exceeding 3 percent of either nor 4 percent for both.

6. Highly refractory vitroceramics consisting essentially, by weight of $SiO_2$ 26–30 percent by weight $Al_2O_3$ 45–50 percent, CaO 10–16 percent, $ZrO_2$ 8–12 percent.

7. A vitroceramic body according to claim 5, having a softening point at least about 1,350°C., containing crystals of pure $ZrO_2$ and crystals of anorthite, and being opaque and of white color.

8. A vitroceramic body according to claim 5, having a softening point at least about 1,350°C., containing crystals of pure $ZrO_2$ and crystals of gehlenite, and being opaque and of white color.

9. Translucent vitroceramics consisting essentially, by weight, of $SiO_2$ 25-35 percent $Al_2O_3$ 40-50 percent, CaO 10-20 percent, $ZrO_2$ 8-12 percent.

10. A white opaque vitroceramic having the composition, by weight, of $SiO_2$ 25-35 percent. $Al_2O_3$ 40-50 percent, CaO 10-20 percent, $ZrO_2$ 8-12 percent said constituents constituting at least about 90 percent of its weight.

* * * * *

PO-1050
(5/69)

UNITED STATES PATENT OFFICE
CERTIFICATE OF CORRECTION

Patent No. 3,772,041  Dated November 13, 1973

Inventor(s) Jean Paul Tochon

It is certified that error appears in the above-identified patent and that said Letters Patent are hereby corrected as shown below:

Column 8, line 63, the second line of claim 6 should read as follows:
 --tially, by weight, of $SiO_2$ 26-30 percent, $Al_2O_3$--.

Signed and sealed this 23rd day of April 1974.

(SEAL)
Attest:

EDWARD M.FLETCHER,JR.
Attesting Officer

C. MARSHALL DANN
Commissioner of Patents